C. T. WESTLAKE.

CAR TRUCK.

APPLICATION FILED JAN. 28, 1913.

Reissued June 10, 1913.

13,576.

Inventor

Chas. T. Westlake,

Witnesses

~~J. Adolph Bishop~~

Lily Rost

By F. R. Cornwall

Attorney

UNITED STATES PATENT OFFICE.

CHARLES T. WESTLAKE, OF ST. LOUIS, MISSOURI, ASSIGNOR TO SWING ROLLING TRUCK CO., A CORPORATION OF DELAWARE.

CAR-TRUCK.

Specification of Reissued Letters Patent. Reissued June 10, 1913.

13,576.

Original No. 819,480, dated May 1, 1906, Serial No. 290,724. Application for reissue filed January 28, 1913. Serial No. 744,790.

*To all whom it may concern:*

Be it known that I, CHARLES T. WESTLAKE, a citizen of the United States, residing in the city of St. Louis and State of Missouri, have invented certain new and useful Improvements in Car-Trucks, of which the following is a full, clear, and exact description, such as will enable others skilled in the art to which it appertains to make and use the same, reference being had to the accompanying drawings, forming part of this specification.

My invention relates to new and useful improvements in car trucks and particularly to roller supports for car bodies, whereby when the car body rounds a curve at comparatively high speed the centrifugal force developed is utilized to elevate the outer side of the car body to a higher plane than the inner side, thus absorbing the centrifugal force by making it raise a car body, and when rounding a curve at comparatively low speed the lateral thrust produced by the super-elevated outer track rail is utilized to elevate the inner side of the car body, thus tending to level said car body and preventing all tendency of said body to overturn.

Figure 1:
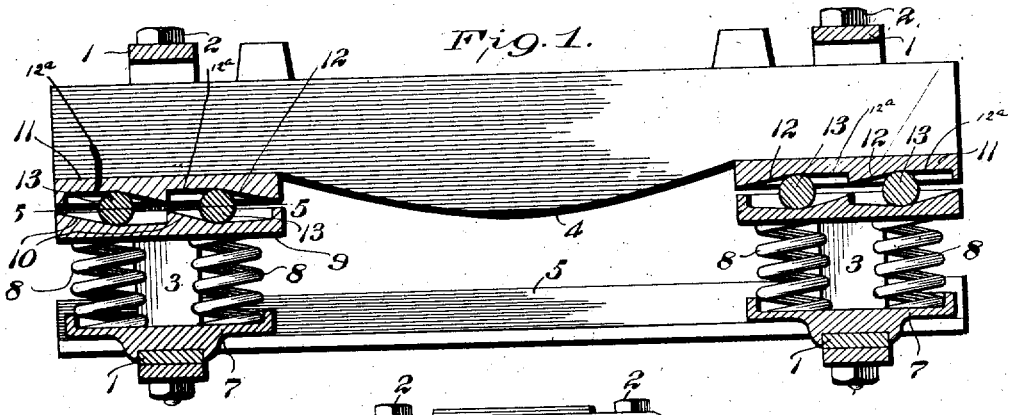
Figure 2:
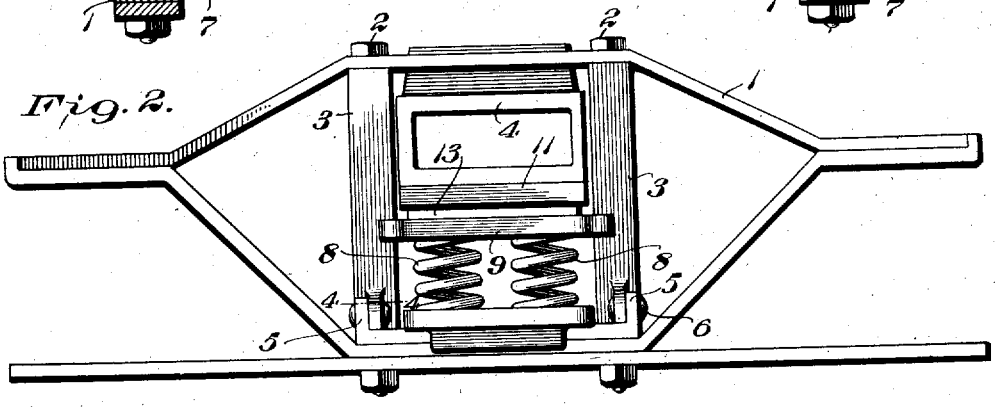
Figure 3:
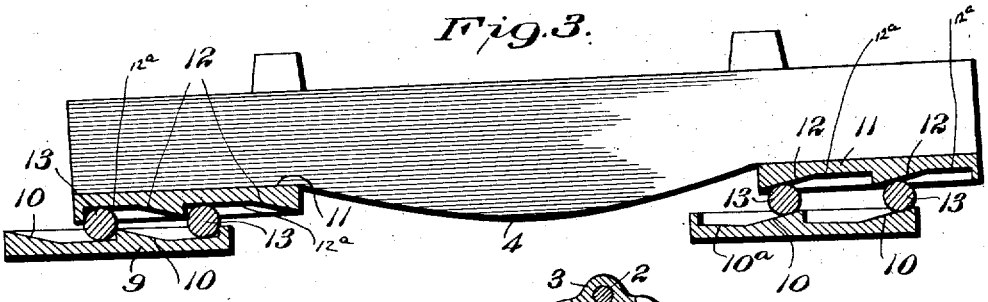
Figure 4:
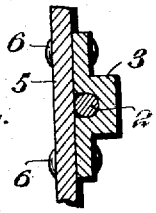
Figure 5:
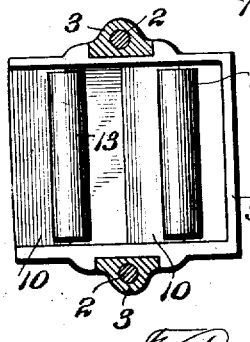

In the drawings: Figure 1 is a transverse sectional view through my improved car truck. Fig. 2 is an end elevational view of the parts shown in Fig. 1. Fig. 3 is a view of some of the parts shown in Fig. 1, showing the changed position thereof. Fig. 4 is a sectional view on line 4—4, Fig. 2. Fig. 5 is a horizontal sectional view on line 5—5, Fig. 1.

1 designates the side frame of the truck, 2 the column bolts, 3 the bolster guides, 4 the bolster, 5 the tie angles constituting the spring plank secured to the bolster guides by means of rivets 6, 7 the spring seats and 8 the bolster springs, all of said parts being of ordinary or approved construction.

9 indicates the spring cap or follower cooperating with the springs 8, there being one under each end of the bolster, and whose upper faces are provided with runways having inclined portions 10 and horizontal portions $10^a$ the junction of these two portions being approximately midway each runway.

11 indicates the upper bearing plates arranged under the bolster 4 and located above the plates 9. Each of the plates 11 is provided with inclined runways 12 which in the normal position of the parts as shown in Fig. 1 are located in the vertical plane of the horizontal runways $10^a$ of the plates 11 and horizontally disposed runways $12^a$ which, as shown in Fig. 1 are located in a vertical plane above the inclined runways 10. In this manner the inclined runways are disposed in opposite directions so that the inclined planes of the runways are reverse with respect to each other.

13 represents rollers positioned in the runways formed by the planes 10 and $10^a$ and 12 and $12^a$.

In the practical use of my bearing support whenever longitudinal thrust is imparted to the bolster due to the lateral or transverse movement of the car body, the upper bearing plates 11 which are fitted to the bolster partake of the movement of the bolster. The bearing rollers 13 at the side of the car above one track rail ride upwardly and outwardly on the inclined planes 10 of the lower bearing plate 9 and on the outwardly inclined planes 12 of the upper bearing plate 11. The end of the bolster which is supported by these rollers is therefore elevated. Simultaneously with the action just described the roller bearings 13 between the bearing plate 9 and 12 at the opposite end of the bolster or that end located above the other track rail roll upon the approximately horizontal portions of the tracks $10^a$ and $12^a$, and consequently, this end of the bolster is not elevated to any appreciable degree, or only sufficiently elevated to make the rollers self-centering. By thus elevating one end of the bolster, the same is tilted and as a result the car body cants inwardly with respect to the arc of the track curve and as a result of this movement the center of gravity of the car body is not moved outwardly as far or to the same point as if both sides of said car body were raised a like amount and at the same time shifted laterally. Such action tends to maintain the equilibrium of the car and avoids undue thrust of the wheels on the outer rails of the curve. The wheels of the car are thus caused to remain on both rails of the curve notwithstanding the tendency of centrifugal force to throw the flanges of the wheels against the outer rail of the curve.

To prevent the rollers 13 from becoming freed and displaced during the thrust of the bolster due to the outer bearing plates pivoting on the outermost of said rollers, the innermost runway $10^a$ is preferably inclined slightly, as shown in Figs. 1 and 3, so that the inner rollers 13 traveling thereon will move upwardly a slight extent which is permitted by the tilt of the bolster as shown in Fig. 3. This slight inclination of the runways $10^a$ also tends to restore the inner rollers 13 to central position.

What I claim is:

1. A car having a rolling body support adapted to elevate one side thereof only as the car body moves laterally with respect to the truck.

2. A car having a rolling body support adapted to raise one side thereof while the other side moves in a substantially horizontal plane.

3. In a car, the combination with a bolster, of a rolling support for said bolster adapted to elevate one end thereof only as said bolster moves upon said rolling support.

4. A car having a rolling body support adapted, when the car body moves laterally from its normal position, to elevate one side of said body to a higher plane than the other.

5. In a car, the combination of a bolster, and a pair of roller supports for said bolster; one of said supports being adapted to impart a rising motion to one end of said bolster while at the same time the other of said supports provides for a horizontal motion of the other end of said bolster.

6. In a car, the combination of a bolster, two sets of bearing plates supporting said bolster, and rollers interposed between the bearing plates of each of said sets; said bearing plates having runways for said rollers that are in part inclined planes and in part horizontal planes.

7. In a car, the combination of a bolster, two sets of bearing plates supporting said bolster, and rollers interposed between the bearing plates of each of said sets; one of said bearing plates in each set having a runway in part an outwardly extending inclined plane and in part a horizontal plane and the mating bearing plate in each set having a runway in part an inwardly extending inclined plane and in part a horizontal plane.

8. In a car, the combination of a bolster, two sets of bearing plates supporting said bolster, and rollers interposed between the bearing plates of each of said sets; each of said bearing plates having a plurality of runways each in part an inclined and in part a horizontal plane.

9. In a car, the combination of a bolster, two sets of bearing plates supporting said bolster, and rollers interposed between the bearing plates of each of said sets; one of said bearing plates in each set having a plurality of runways each in part an outwardly extending inclined plane, and in part a horizontal plane, and the mating bearing plate in each set having a plurality of runways each in part an inwardly extending inclined plane and in part a horizontal plane.

CHARLES T. WESTLAKE.

In the presence of—
M. P. SMITH,
M. A. HANDEL.

Copies of this patent may be obtained for five cents each, by addressing the "Commissioner of Patents, Washington, D. C."